(12) United States Patent
Allen (10) Patent No.: US 8,638,367 B1
(45) Date of Patent: Jan. 28, 2014

(54) TELEVISION IMAGE GOLF GREEN FALL LINE SYNTHESIZER

(76) Inventor: Dillis V. Allen, Schaumburg, IL (US)

(*) Notice: Subject to any disclaimer, the term of this patent is extended or adjusted under 35 U.S.C. 154(b) by 283 days.

(21) Appl. No.: 13/067,278

(22) Filed: May 19, 2011

(51) Int. Cl.
*H04N 7/18* (2006.01)
*H04N 15/00* (2006.01)
*A63B 57/00* (2006.01)

(52) U.S. Cl.
USPC .............................. 348/157; 348/42; 473/404

(58) Field of Classification Search
USPC .......................................................... 348/42
See application file for complete search history.

(56) References Cited

U.S. PATENT DOCUMENTS

| | | | |
|---|---|---|---|
| 5,825,997 A * | 10/1998 | Yamada et al. | 345/419 |
| 6,774,932 B1 * | 8/2004 | Ewing et al. | 348/157 |
| 7,713,148 B2 * | 5/2010 | Sweeney | 473/404 |
| 2002/0173906 A1 * | 11/2002 | Muramatsu | 701/207 |

* cited by examiner

*Primary Examiner* — Dave Czekaj
*Assistant Examiner* — Leron Beck
(74) *Attorney, Agent, or Firm* — Dillis V. Allen, Esq.

(57) ABSTRACT

A television signal and image processing system that superimposes an indicator of the fall line of a golf green adjacent the hole on the green image to be televised to the viewer. This process is achieved by generating and storing typographical maps of the greens on a golf course and generating and storing the locations of the holes on those greens, the locations of the holes are then merged with topography of the individual greens, and then the high (above the hole) and low (below the hole) fall lines are calculated in xyz coordinates, and synthesized arrows having the same coordinates are then applied to the merged topography with one arrow on the high side of the hole point downwardly on the fall line in three dimensions and a second arrow on the low side of the hole also pointed downwardly.

7 Claims, 7 Drawing Sheets

Fig.12

TELEVISION IMAGE GOLF GREEN FALL LINE SYNTHESIZER

BACKGROUND OF THE INVENTION

It has been important in the last decade in the television processing and broadcasting of professional golfing events to enhance and highlight the parameters representing the various multiple and complex surfaces of the greens on the course being played by professionals in a specific tournament, such as the ProAm in Pebble Beach, Calif., the Doral in Miami, Fla., the Masters in Augusta, Ga., and many others including the many major tournaments played in the Chicago area at Cog Hill Country Club, Medinah Country Club in Medinah, Ill., and Oakbrook Country Club in Oakbrook, Ill.

There have been many video systems to visualize the path of the ball on the putting green to the hole, both for the golfer and the viewer of the video of the stroke and path of the putt. These basically have fallen into equations that calculate at least some of the length of the putt, the topography between the ball position on the green and the hole, the mass of the ball, the mass of the putter, the input velocity of the putter, the ball exit velocity from the putter face, and the speed of the green measured by a stint meter, wind velocity in the green area.

With all this information, it is possible, and has been done to some extent, to synthesize and display the path of a properly struck holed ball between almost any place on the green and the hole both before and during the actual striking of a putt in almost real time. This technology has achieved some modicum of success in golf including Fox Network.

However, the popularity of this technology has been waning in recent years (2010-2011) because of its complexity, real time delay, camera location identification, and other factors.

The Ewing Golf Association, U.S. Pat. No. 6,774,932, exemplifies this complex technology and it has achieved some commercial success with U.S. national television broadcasting, particularly with Fox Networks, but this system has drawbacks that have diminished its attractiveness both at present and possibly in the future—although its prestrike putting path graphics have been impressive in some cases.

The Ewing system involves the processing of green contour information with the position of the player's ball and calculating, using the above parameters, the synthesized path of the ball to the hole. This is an effective television viewer analysis tool.

However, the Ewing process is complex and has significant drawbacks that have diminished the use of the Ewing systems in U.S. golf broadcasting process.

Firstly, the Ewing system requires three cameras, and such cameras may also be used in the present invention: those are a Blimp camera, a tower camera at each green or at least the green under consideration, and a hand-held camera that is mobile around the green as real time play and putting or chipping on the green proceeds. The Ewing system requires that the spatial position of the cameras (as well as the pan, yaw, and tilt) be calculated. Those parameters are not difficult for the tower camera which is fixed except for movement of the tower camera relative to the tower camera base which is easily calculated. However, those parameters are difficult for the Blimp camera and the mobile camera because they are constantly moving.

It is not practically possible to spatially locate the Blimp camera or the mobile walking camera because laser tracking requires extensive equipment and a high labor content, and GPS tracking does not have the accuracy to delineate the 0.010 inch differentials in the slope of a green to optimize this technology and the slope of the green or path of the ball. Thus, the Ewing technology is not practical for either the Blimp camera image production, or the hand-held mobile camera.

Another problem with the Ewing system is that it requires a delay in television transmission to viewers as its high power microprocessor makes the putt path generation calculation. This can take one or more seconds. Television broadcasting in real time cannot easily handle even this small delay because it creates multiple confusions and complications down the transmission line network to the local transmitters and the ultimate local network viewers.

Another problem in this existing system is the spatial location of a combination of at least 2 or 3 cameras, depending on the technology, to determine multiple ball positions topographically and hole position differentials. The identification of the three camera positions with xyz coordinates, and the pan, tilt, and yaw of each camera are extremely complex inputs to this prior system.

The calculated ball trajectory of the prior system is also complex and time consuming in real time display.

Also, the Ewing system depends upon a single Stimp speed reading, which is only a single number for each or sometimes multiple greens. Moreover, stimp meter speed readings not only vary from one green to another on a given course at a given time on a given green, but also vary from one location on a green to another, varied by such variables a grain direction, for example.

It would be desirable to eliminate many of the disadvantages of the Ewing system and make it more palatable to commercial golf television broadcasting. These include eliminating the complete putting path display that causes the broadcast delay and the subsequent confusion. The second is eliminating the identification and data relating to camera location, ball on the green location, and other parameter calculations.

Others objects and advantages will appear more clearly from the following detailed description of the invention.

SUMMARY OF THE PRESENT INVENTION

According to the present invention a golf television green presentation is highlighted by providing fall line indicators around the putting hole in real time to show the viewer the greatest slope directly adjacent the hole. The stored topography of each green is embellished with each hole location and fall line is calculated with this information. Graphics of fall direction, such as an arrow, with an angular quantification graphics such as "6 degrees" is registered and superimposed on all the multiple camera images around the green. The arrows and legends are synthesized on the real time image both on the high side and the low side of the hole, if the two are different in xyz coordinates.

Further, according to the present invention a television signal and image processing system is provided that superimposes an indicator of the fall line of a golf green adjacent the hole on the green image to be televised to the viewer. This process is achieved by generating and storing topographical maps of the greens on a golf course and generating and storing the locations of the holes on those greens. The locations of the holes are then merged with topography of the individual greens, and then the high (above the hole) and low (below the hole) fall lines are calculated in xyz coordinates, and synthesized into arrows having the same coordinates and then applied to the merged topography with one arrow on the high side of the hole pointing downwardly on the fall line in three dimensions and a second arrow on the low side of the hole also pointed downwardly, but possibly on a different xyz coordinate, away from the hole.

Also, the vertical downward view of the two arrows may change because of a right to left, or a left to right slope of the green around the hole. Thus, the arrows in the present invention may be angularly related looking downwardly along the axis of the cup.

In this way the visual representation of the two arrows and the green cup, and the graphics of the angular indicia of the arrows e.g. "9 degrees" positioned over and in line with the arrows, rotate in three orthogonal directions as the cameras move to present to the viewer an accurate image of the fall line of the hole or cup in three orthogonal directions in real time regardless of camera position.

The position, in xyz, or the pan, tilt or yaw of the camera is in some plotting instances irrelevant to the present computations. For example, if image and topo registration is based on topo green perimeter line or outline data and camera green perimeter line or outline data, camera xyz is irrelevant and eliminated from the process. This registration technology is presently known.

On the other hand, if registration is based on camera position, tilt, yaw and pan, the present system is still very simple. This mode is relevant for the tower camera technology, which can use registration techniques other than green outline.

The present system also provides for subtracting and adding the image of the golfer as he moves up and around the green with the fall line arrows and legends in place. This is achieved by known technology of subtracting the golfer's images from the raw camera image and then adding them to the arrow modified image to blanket the arrows with the added images technology similar to football first down line technology.

All professional golfers know that puts break the most near the cup—this is because the ball is decelerating and slowing the most near the cup. A slower ball on the same right to left or left to right slope will break more than a faster one. As a result, the pros pay more attention to the green break right at or around the cup than the break as the ball leaves the putter face.

Many amateurs and professionals, as well, use the plumb bob method to analyze green slope. The proper way to plumb bob is to stand directly behind the ball, hang the putter shaft visually engaging the ball on one side and one side of the cup to estimate the angular slope of the cup to the vertical line of the one side of the putter shaft. This really validates the present systems emphasis of the slopes of the green both high and low around the cup.

DETAILED DESCRIPTION OF THE PREFERRED EMBODIMENTS

Figure 1:
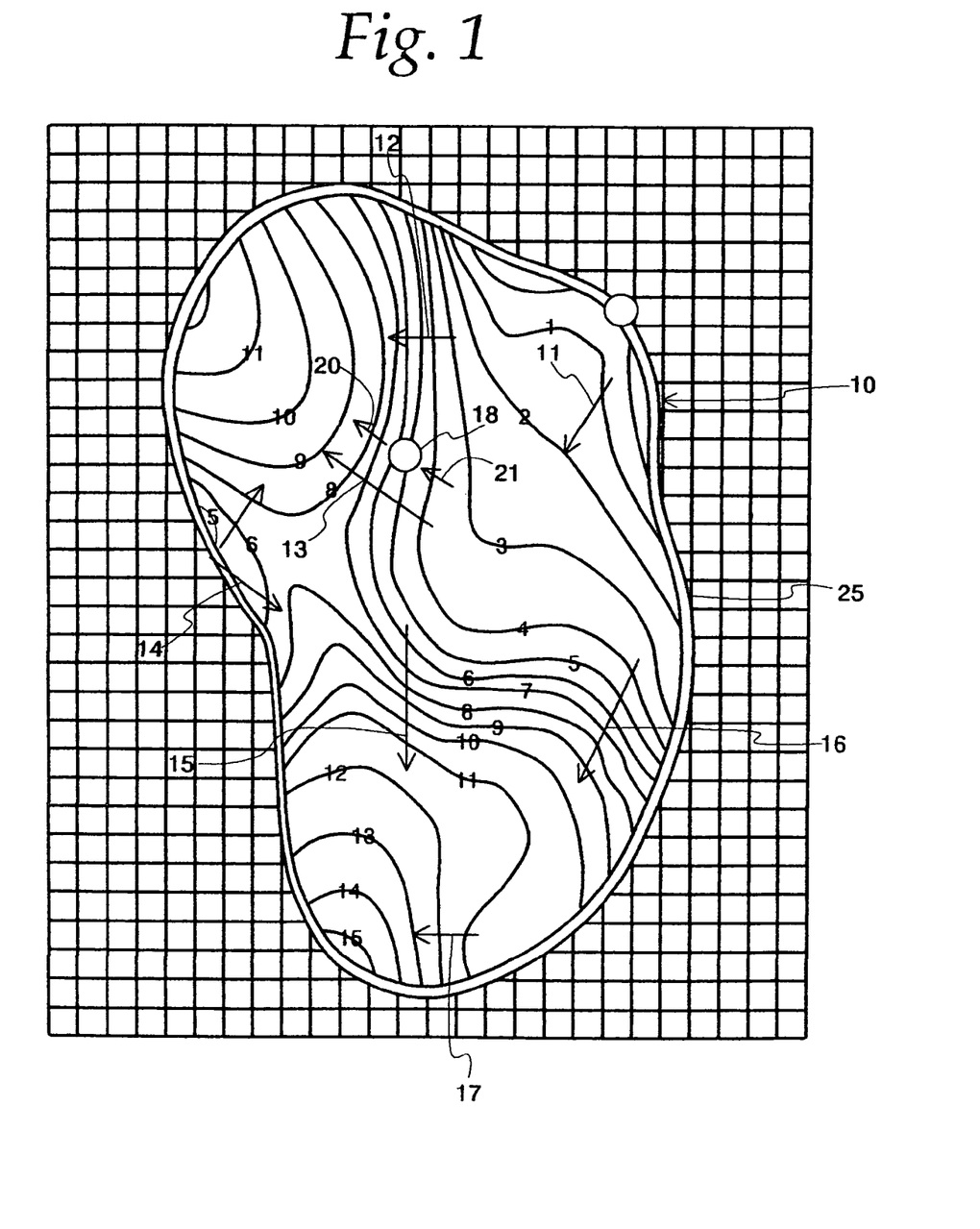
FIG. 1 is a plan view of a typical golf green with conventional typography lines and arrows representing various fall lines on the greens.
Figure 2:
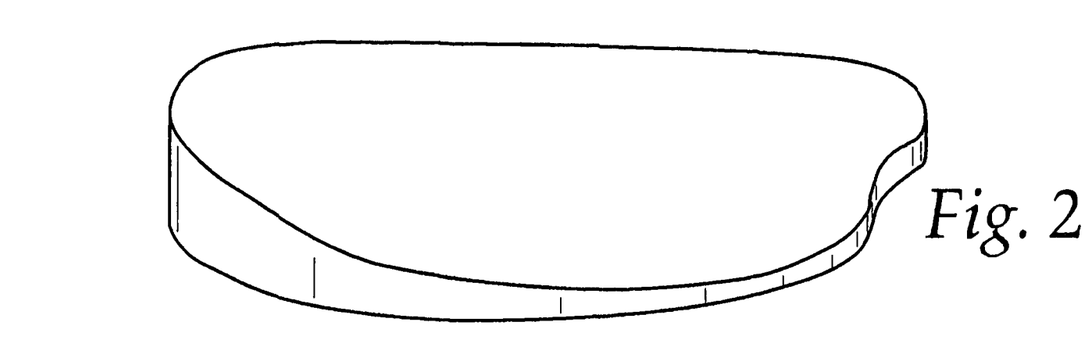
FIG. 2 is a computer-generated graphics perspective of another exemplary golf green.

Viewing FIG. 1, a top view of a golf green 10 is illustrated with topographical lines 0 to 15 therein, as well as arrows 11, 12, 13, 14, 15, 16, and 17 representing the fall lines dictated by the topographical lines 0 to 15 at various positions on the green.

As one familiar with topography will appreciate, each of the lines 0 to 15 represent lines of constant elevation; and secondly, the elevation change from adjacent lines is equal throughout the topographical map illustrated. No specific elevation differential is set forth in FIG. 1 because the differential could have a wide range of values. For example, the difference in elevation between 0 and 1 and 1 and 2, etc. could be one inch or could be one foot (although unlikely). If it were one inch, the maximum elevation change between 0 and 15 would be 15 inches. If the differential between topo lines 0 and 1 or 1 and 2 were one foot, then the difference in elevation between line 0 and line 15 would be 15 feet. However, for the purpose of the present discussion, it is irrelevant whether the topo line differential is one inch or one foot.

The purpose of the present invention is to synthesize 3D indicating arrows, such as arrows 20 and 21, adjacent the cup 18 wherever it is cut on the green 10. In this example, the arrows 20 and 21 are located on the fall line with the arrow 21 being on the high side of the cup 18 and arrow 20 being on the low side. It should be noted that the arrows 20 and 21 are firstly lying, not necessarily, although frequently, in a common line or co-linear (See FIG. 4). Furthermore, the arrows 20 and 21 are also not necessarily equi-angular in planes perpendicular to the plane of FIG. 1. For example, arrow 20 may have a 6 degree angle in a plane vertical to FIG. 1, while arrow 21, which does not lie in the vertical plane of arrow 20, may have a angle of 7 or 8 degrees in its vertical plane perpendicular to the plane of FIG. 1.

According to the present invention, the vertical angles are indicated on 3D legends adjacent and over the arrows 20 and 21.

An important aspect of the present invention is that all of the information necessary to calculate the position of arrows 20 and 21 are almost always known prior to the real time broadcast of a golf tournament. Over 90% of PGA tour professional tournament golf courses have topographical data for all of the 18 greens involved.

Furthermore, the location of the holes or cups on the greens is also determined by laser i.d. prior to each day's round because that information is necessary for other purposes such as the hole location booklets given to the players and the player's caddy prior to the start of each day's round. Knowing the topography in advance of the real time broadcast and knowing the location of the holes 18 prior to the real time broadcast each day, it is a relatively simple matter to calculate the location of arrows 20 and 21 in xyz coordinates also prior to the initiation of the days round. In this way there is no need, according to the present invention, to make any extensive real time calculations other than to spatially rotate the image of the arrows 20 and 21 and their associated legends depending upon the location of the camera. However, this does not require, as prior systems do, the accurate location in xyz coordinates of the camera or the tilt, yaw and pan of each camera.

The registration of the synthesized image of the green and hole, as well as the arrows 20 and 21 and their legends, is made at each camera simply by registering the perimeter line 25 of the synthesized green with the perimeter line of the green as viewed by the individual cameras.

As is commonly known, television cameras employed at a professional golf course tournament involve many such cameras and typically there are three cameras positioned about each green. The first is a platform camera, which is fixed on a tower adjacent the green, the second is a mobile camera with a walking camera man, and the third, at many tournaments at least, is a camera mounted under an overhead blimp. These cameras generate image signals which are transmitted to a direction booth usually at the course in a trailer, where the director selects the desired image to be broadcast to the viewers. The present invention requires the use of a high powered computer which would also be positioned within this direction booth.

In accordance with the present invention, the TV images in the booth have the topo data illustrated in FIG. 1 superimposed over the real time televised pictures. The registration of this contour data with the real time TV pictures is effected through the use of known pattern recognition technology, which aligns or registers the edge of the topo green with the live television green edge.

Another aspect of the present invention is that the image of the golfers on the green can be subtracted from the image through known technology so that the arrows and legends according to the present invention, do not overlap the images of the golfer. After the arrows and legends have been synthesized and applied to the green image, the image of the golfers is overlaid thereover so that the golfers appear to be blocking out the arrows as the golfer walks between the cup and the camera lens. This technology, of course, is utilized in professional football broadcast where the first down line on the image is synthesized.

The microprocessor according to the present invention includes graphic sub-systems and compute sub-systems and, of course, must have sufficient capacity to make the complex calculations necessary for the present invention. The graphics, of course, are 3-D graphics that permit rotation of the arrows and legends in xyz coordinates without limitation.

Another feature of the present invention is that in the event the high and low fall lines are equi-angular and co-linear, only one of the arrow and legend images will be displayed.

The definition of the fall line of both high and low indicating arrows is that line lying in a vertical plane extending through the axis of the cup 18 having the greatest angular extension from a horizontal line lying in the same vertical plane at the top of the cup 18. The fall line, of course, is the major factor in determining the path of the ball and will greatly aid the viewer in analyzing where the golfer's putt is going to travel as it approaches or even passes the cup 18.

Figure 3:
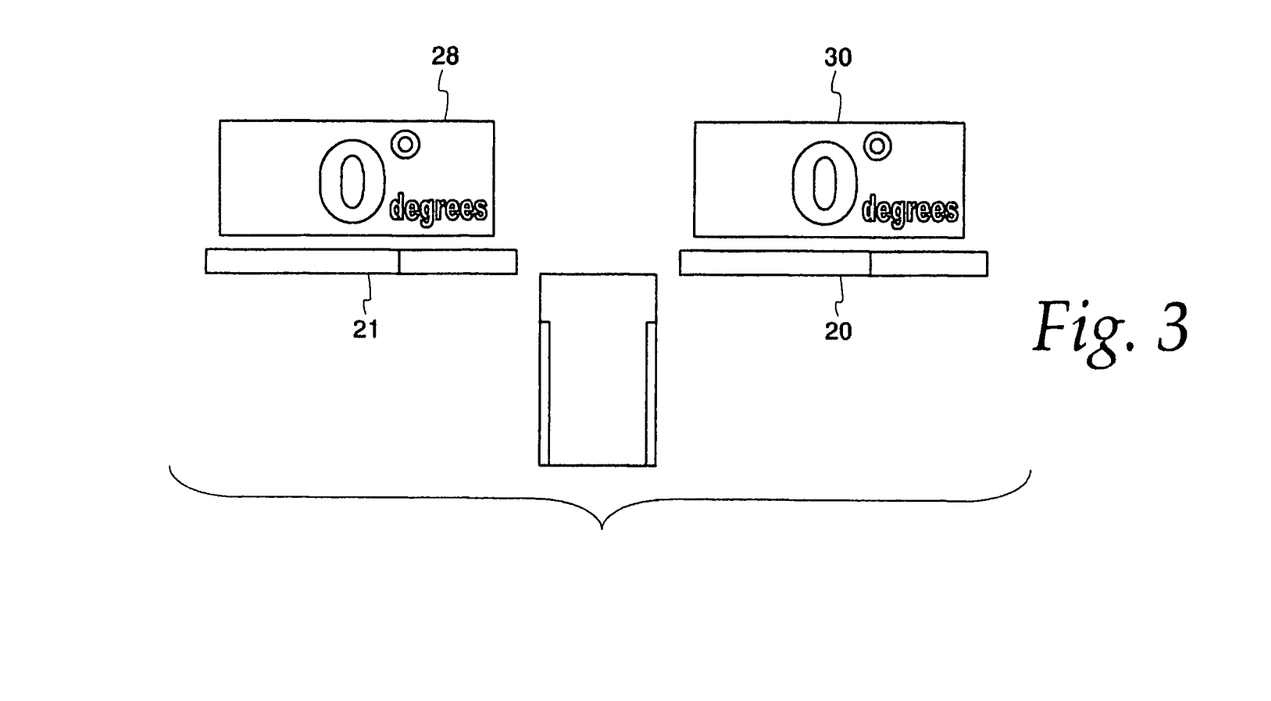
FIG. 3 is a side view of the high and low fall line indicating arrows adjacent a golf cup.

FIG. 3 is a side view of the indicating arrows 20 and which lie in a horizontal plane in FIG. 3, along with legend 28 associated with arrow 21 and legend 30 associated with arrow 20. It should be understood that the legends 28 and 30 are synthesized and applied to the real time image along with the arrows 21 and 20, and the cup 18, and the images, of course, rotate on three axes depending upon the location of the camera adjacent the green.

Figures 4, 5:
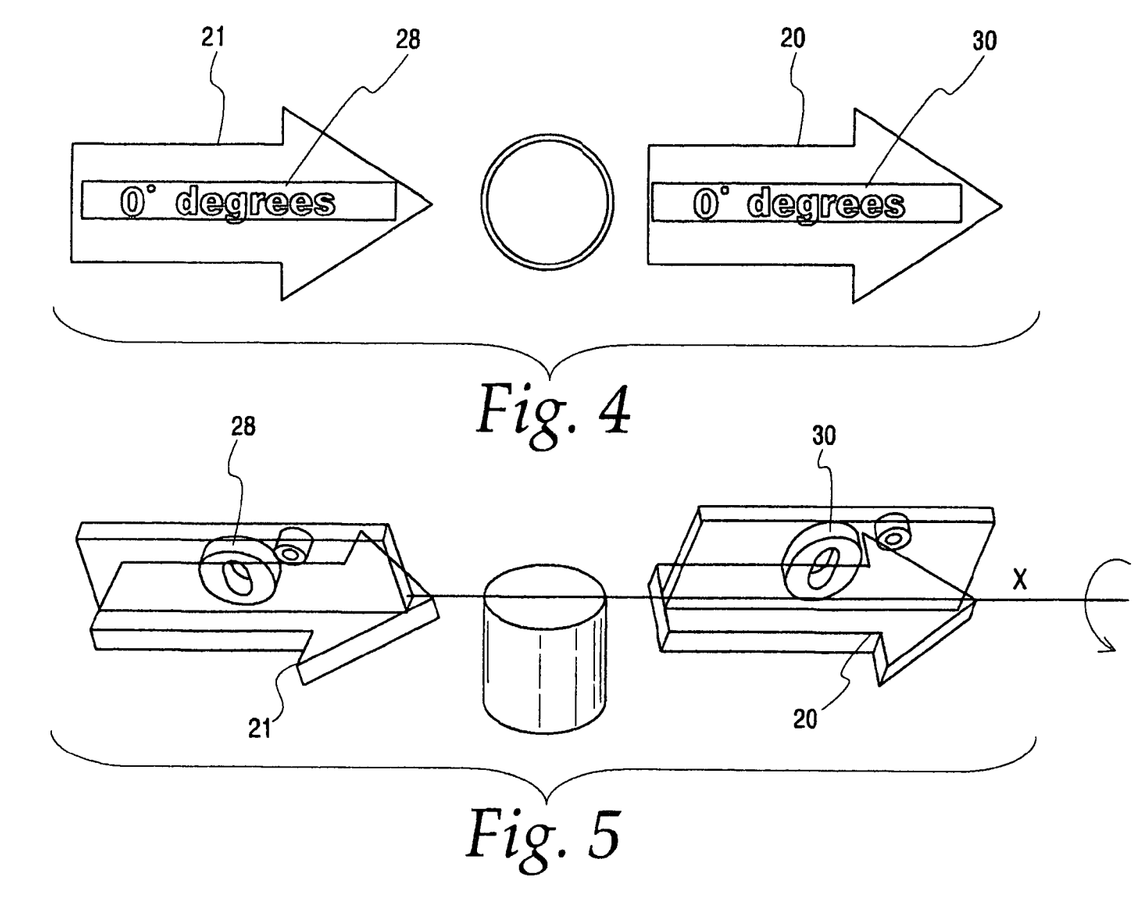
FIG. 4 is a top view of the arrow indicators and cup illustrated in FIG. 3.
FIG. 5 is a view of the high and low fall line indicating arrows in FIGS. 3 and 4 with the cup there-between rotated about 45 degrees around a horizontal axis.

In FIG. 4, the arrows 21 and 20 and legends 28 and 30 are viewed in a planar top view. In FIGS. 3 and 4 the arrows 21 and 20 lie in a horizontal plane so that neither arrow 20 nor 21 is the high side or low side arrow, and the same is true of the top view in FIG. 4 and the horizontal axis rotation view of FIG. 5.

Figure 6:
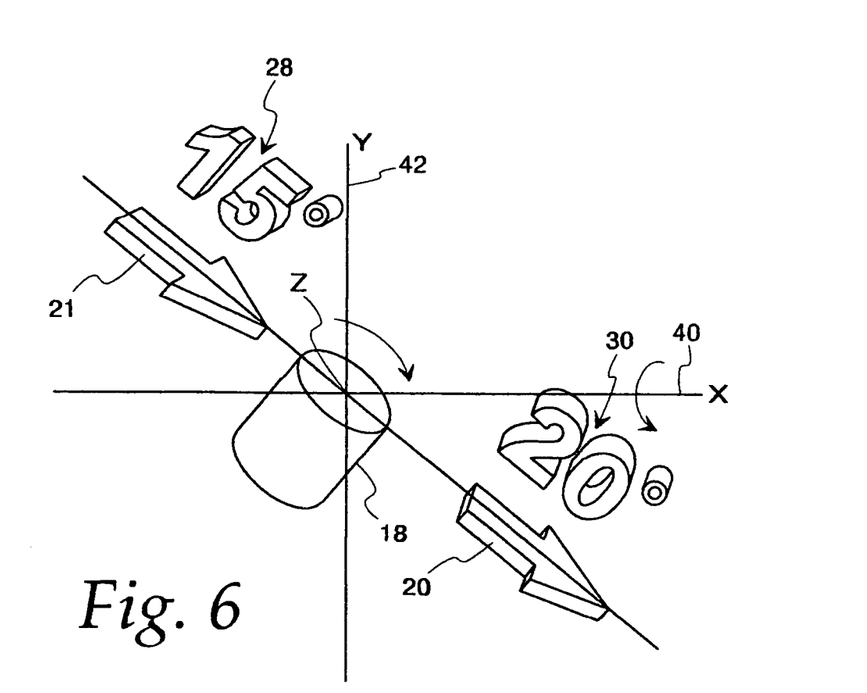
FIG. 6 is a view of the high and low fall line indicating arrows and cup illustrated in FIGS. 3, 4, and 5, rotated about a horizontal axis and about an axis perpendicular to the plane in FIG. 6.

In FIG. 6, however, the arrows 20 and 21, as well as the legends 30 and 28, are viewed from behind the plane of FIGS. 3, 4, and 5, and are rotated together including cup 18 not only about a x axis 40, but also about z axis 41.

Figure 7:
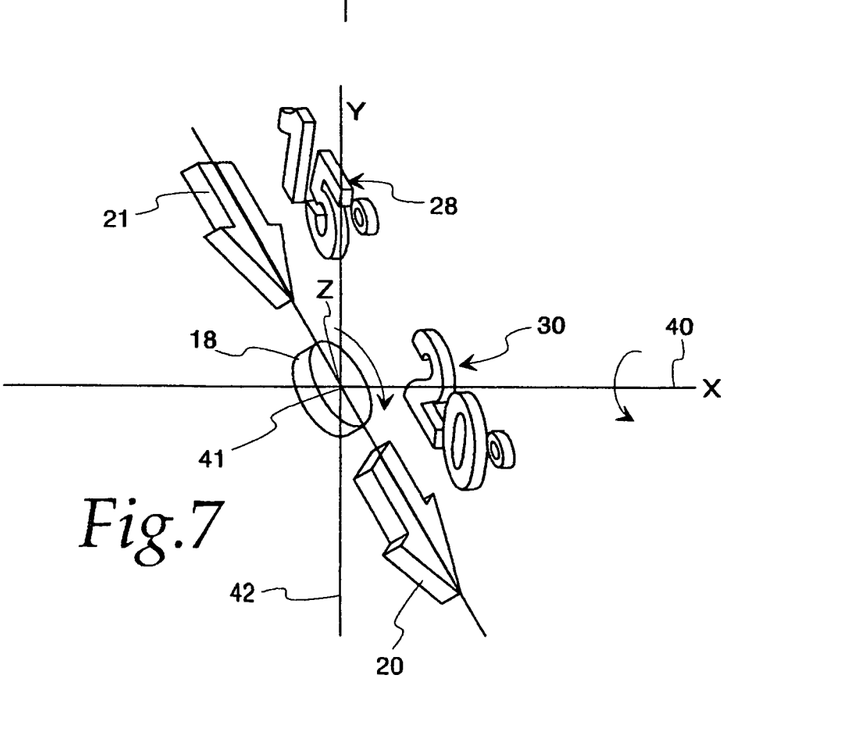
FIG. 7 is a view of the high and low fall line indicating arrows and cup rotated about a horizontal axis, a z axis perpendicular to the plane of FIG. 7 and about a vertical axis.

In FIG. 7, the arrows 20 and 21 and legends 30 and 28 are rotated about x axis 40, z axis 41, as well as y axis 42.

According to the present invention, the arrows 20 and 21 and their associated legends 30 and 28 are synthesized by an image generator and rotated along the x, y and z axes to the position of the image of the particular camera selected by registering the synthesized edge of the green with the edge of the green as viewed in real time by the individual cameras.

Another aspect of the present invention is that when the camera is in a position such that the image generated could not be visualized by the viewer, such as when the camera is near a vertical plane extending longitudinally through the image; i.e., looking at the image from near its end or front view, the legend synthesizer automatically rotates the image away from the plane perpendicular and co-linear to the arrow and into the plane of the real time image so that it can more easily be read by the viewer.

Figure 8:
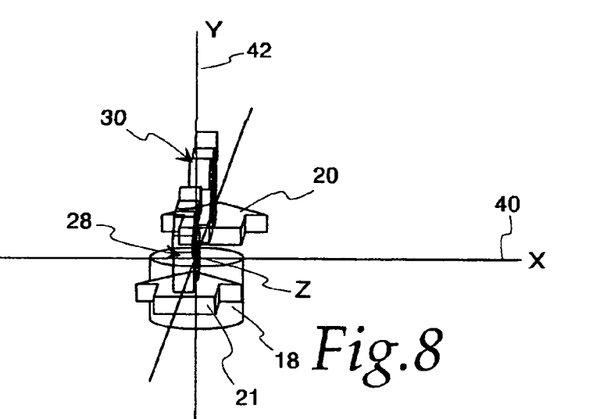
FIGS. 8 through 10 represent depictions of the FIGS. 6 and 7 arrow and hole assembly with angle legends taken at different camera angles.
Figure 9:
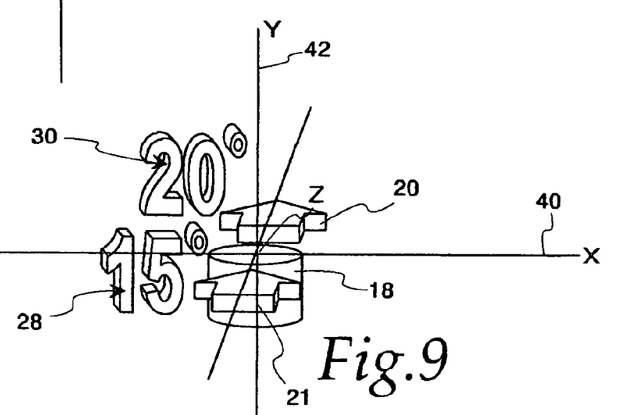
Figure 10:
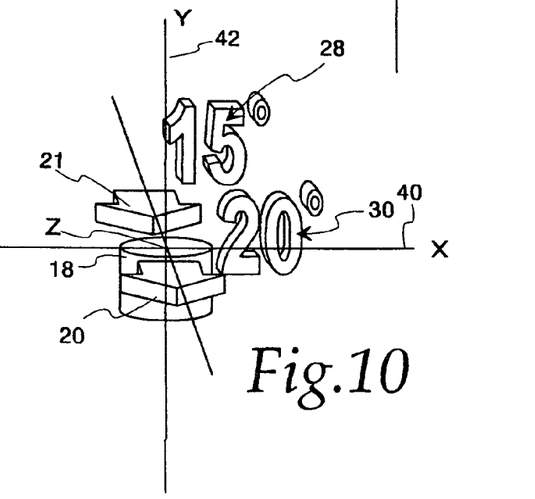

This process, seen in FIGS. 8, 9, and 10, the arrows and legends can frequently be positioned by camera angles in a longitudinal plane close to to the camera axis. In this system and as seen in FIGS. 9 and 10, the program swings the angle legends close to the plane of the image so that the legends are readable to the viewer.

Figure 11:
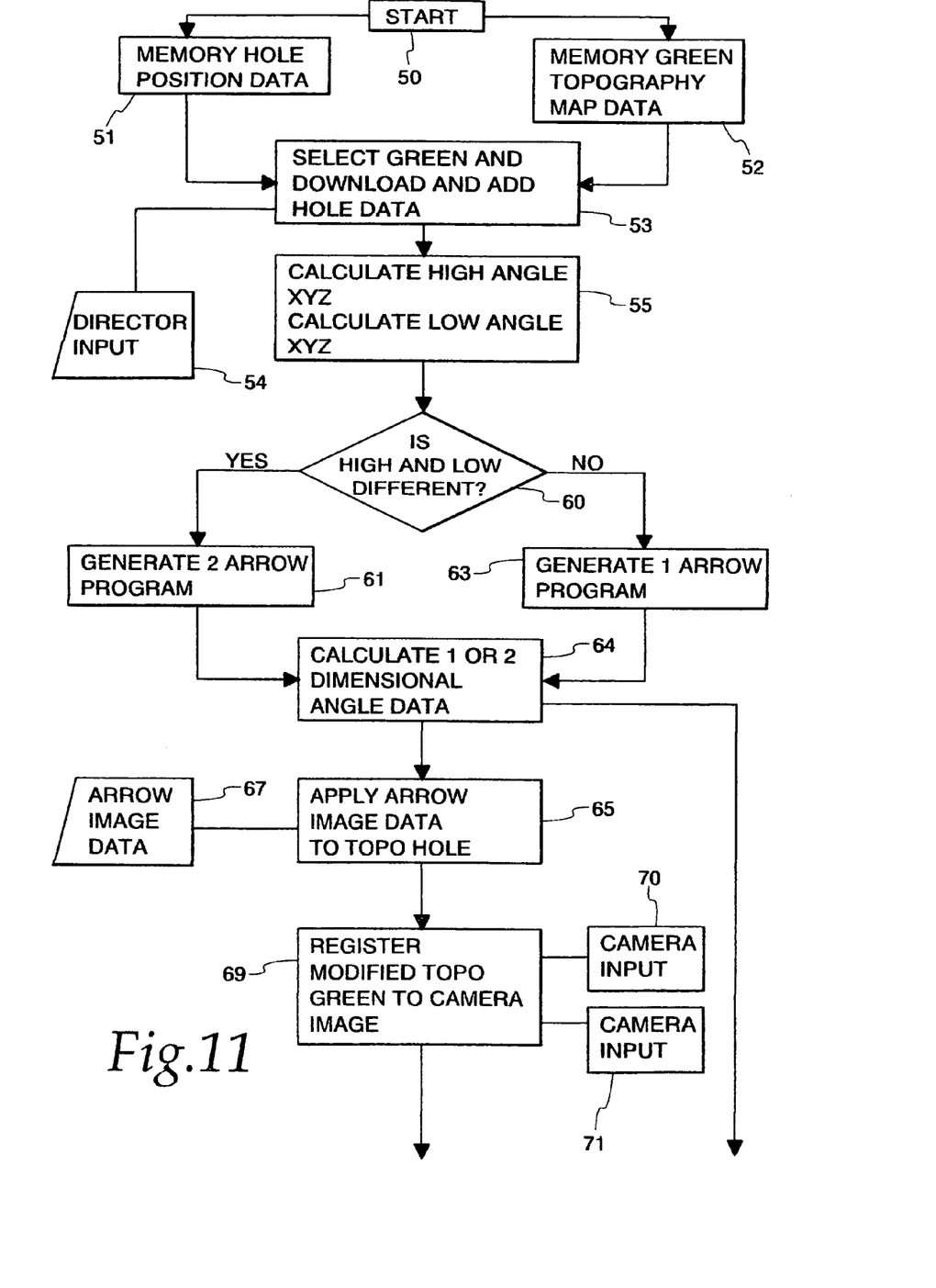
FIG. 11 is the initial part of a flow chart describing the software of the present invention.
Figure 12:
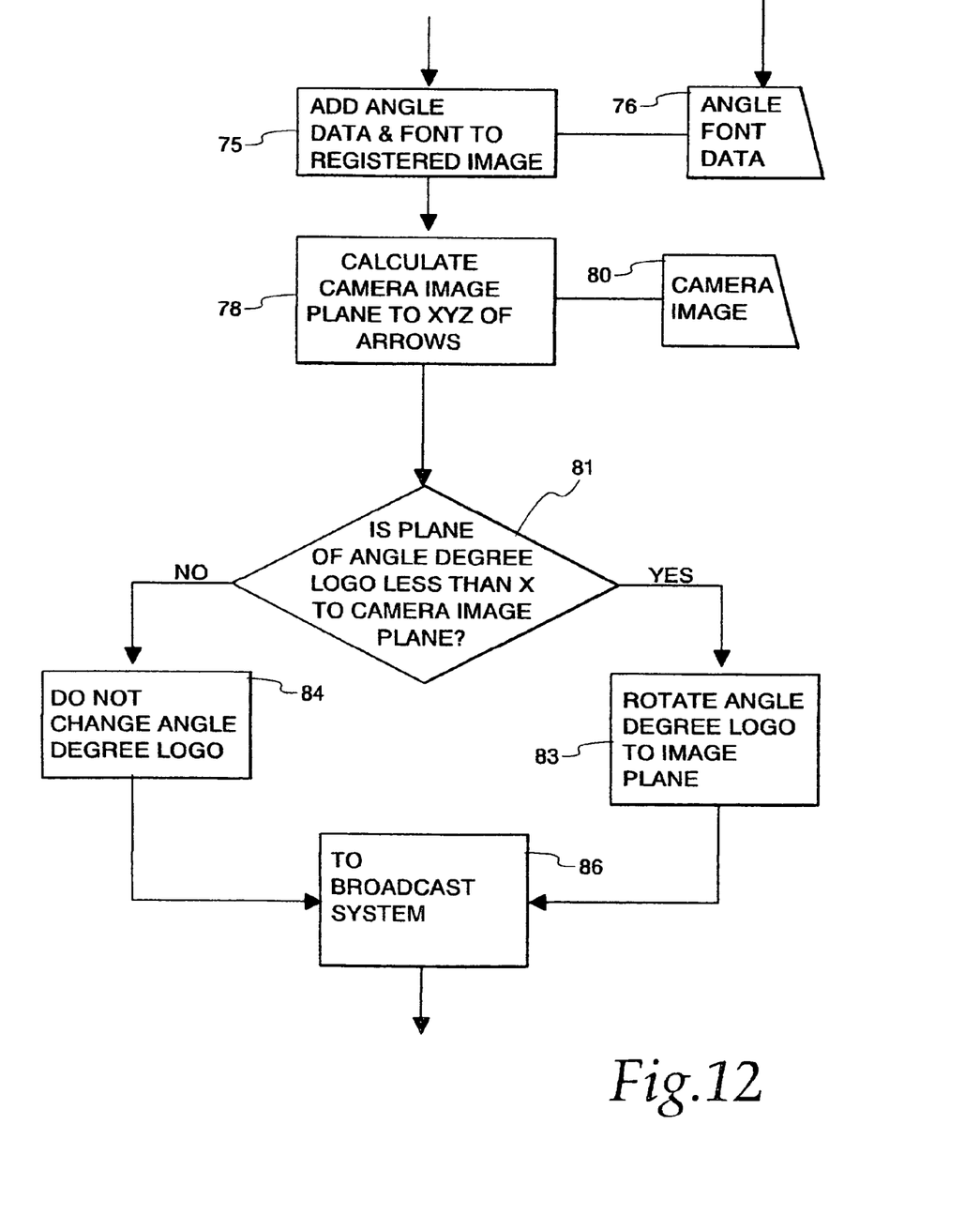
FIG. 12 is a flow chart that follows and is part of the flow chart illustrated in FIG. 10.

FIGS. 11 and 12 depict a single flow chart of the software for the present invention and, therefore, must be read together.

Systems start is shown at 50 and activates memory 51 for the laser determined hole position data as well as a memory 52 for green topographical map data, and 53 is a temporary memory that receives a hole position data for the selected green as well as topographical information for that same green from memory 52 as selected by a director input 54, and 55 is a computation manipulating processor that calculates from 53 both the high fall line angle in xyz coordinates, as well as the low fall line angle in xyz coordinates adjacent to the hole on the selected green. Decision point 60 determines whether the fall line data for the high fall line is different from the low fall line and if it is different, two arrows are generated at 61 and if they are not different, a single arrow is generated at 63.

With this information, processor 64 generates either one or two fall line angle calculation and sends it to 65, which is a synthesizer for an arrow and legend image data input 67. The registration system at 69 receives the synthesized green and topo from 65, as well as the camera image from the selected camera 70 or 71. Registration is achieved by green edge location as described above and is a known technology. In any event, the output from registration 69, processor 75, has arrow and legend data and from that processor 76, and processor 78 calculates the relation of camera image plane from 80 to the font angle and 81 decides whether the camera angle is too close to the plane of the legend so that it cannot be seen readily by the viewer, and if it is too close, synthesizer 83 rotates the legend or legends to the plane of the real time image, and if it is not, processor 84 makes no change in the plane of the image or images, and finally, 86 delivers the resulting image into the associated broadcast system.

The invention claimed is:

1. A synthesized television image golf green highlight system for golf tournament rounds, comprising: one or more cameras capturing real time video of golfers on or adjacent a golf green, a processor for storing topographical data for one or more golf greens on an associated golf course from data obtained prior to the tournament round, said processor also storing data on the location of the hole or holes on the one or more golf greens from data obtained prior to the tournament round, said processor combining the topographical data for one hole with data on the location of the hole for the same hole, said processor determining maximum fall line direction directly adjacent the hole relative to the topographics adjacent to the one hole and developing graphics therefrom, generating an image of the golf green from a green adjacent camera in real time, and combining the camera generated image with the graphics from the maximum fall line direction relative to the topographics without any real time data other than camera video to produce an on-screen image from the graphics directly adjacent the hole of the hole maximum fall line direction without any ball position data.

2. A synthesized television image golf green highlight system as defined in claim 1, wherein said processor for determining angular information relative to the topographics determining the fall line defined as the steepest and highest xyz coordinates of a line laying piercing a horizontal plane on the greatest angle adjacent the hole.

3. A synthesized television image golf green highlight system as defined in claim 1, wherein the processor generates, stores and displays images of an indicator of the high fall line adjacent the hole.

4. A synthesized television image golf green highlight system as defined in claim 1, wherein the processor generates, stores and displays images of an indicator of the low fall line adjacent the hole.

5. A synthesized television image golf green highlight system as defined in claim 1, wherein the processor generates, stores and displays both high and low indicators of the fall lines noting the fall lines may be different from the high and low fall lines.

6. A synthesized television image golf green highlight system as defined in claim 1, including generating actual 2-dimensional angular information on the fall line, generating a font representing that information and super position that font on the angular information display.

7. A synthesized television image golf green highlight system as defined in claim 6, wherein the processor rotates the 2-dimensional angular information font toward 2-dimensional configuration when 3-dimensional angles obscure the 3-dimensional image from the viewer.

* * * * *